United States Patent [19]

Watkins et al.

[11] Patent Number: 4,542,003

[45] Date of Patent: Sep. 17, 1985

[54] CHEMICAL TREATMENT OF SAND

[75] Inventors: Paul Watkins; John W. Scott, both of Kendal, England

[73] Assignee: British Industrial Sand Limited, Redhill, England

[21] Appl. No.: 625,011

[22] Filed: Jun. 27, 1984

[30] Foreign Application Priority Data

Jun. 29, 1983 [GB] United Kingdom ............... 8317669

[51] Int. Cl.$^4$ ............................................. C01B 33/18
[52] U.S. Cl. ................................... 423/340; 423/335
[58] Field of Search ............................... 423/340, 335

[56] References Cited

U.S. PATENT DOCUMENTS 2,583,280  1/1952  Segrove ............................. 423/340

FOREIGN PATENT DOCUMENTS 469271   7/1914   France.
449184   11/1935  United Kingdom ............... 423/340
845746   8/1960   United Kingdom ............... 423/340
2111035  6/1983   United Kingdom ............... 423/340

Primary Examiner—William R. Dixon, Jr.
Assistant Examiner—Steven Capella
Attorney, Agent, or Firm—Stiefel, Gross, Kurland & Pavane

[57] ABSTRACT

A process for treating sand which includes one or more stages in which sand is mixed with a dilute aqueous solution of hydrofluoric or sulphuric acid together with zinc or sodium hydrosulphite and the resulting slurry is agitated at ambient temperature in an atmospheric oxygen-free environment.

12 Claims, No Drawings

CHEMICAL TREATMENT OF SAND

FIELD OF THE INVENTION

This invention relates to the chemical treatment of sand.

BACKGROUND OF THE INVENTION

Many techniques exist for the production of high quality silica sand and beneficiation methods are normally related to the level of contaminant in the raw material. Generally, the industrial processing routes follow a basic pattern and include the washing of sand by a variety of techniques. Essentially, the washing of sand is undertaken using simple settling cones, upward current washing or screw classifiers. Each of these techniques is normally employed to remove the finer fraction material and relies largely on differential settling based mainly on size distribution of mono-mineralic material. Further, as the product will be granular in a size range exceeding 75 μm, settling will also remove the materials of low specific gravity such as clays and organic material.

Numerous methods for the further treatment of sand have also been utilized using chemical and mechanical means.

Chemical treatment methods generally comprise subjecting the sand to an acid treatment stage in which iron impurities are reacted with the acid and taken into solution.

British Patent Specification No. 449,184 discloses a method of purifying sand having free iron present as an impurity by dissolving the iron impurities in a sulphuric acid solution, (without the presence of hydrochloric acid) so that they may be removed by washing, in which the sand is heated in the acid solution within a closed vessel in which no free oxygen is present in the atmosphere or dissolved in the solution, the sand being wholly immersed in the acid solution which is heated to its boiling point.

British Patent Specification No. 651,702 discloses the treatment of sand having a ferruginous coating, comprising agitating the sand with a dilute aqueous solution of hydrofluoric acid containing hydrosulphurous acid or an at least sparingly soluble hydrosulphite and, in addition, pre- or post-treatment froth flotation, to remove heavy mineral contaminants.

Whilst the use of hydrofluoric acid containing a sparingly soluble hydrosulphite is an effective process for the removal of ferruginous coatings, in recent years hydrofluoric acid has become a most expensive reagent and thus is not cost effective when large quantities of sand require to be processed.

The mechanical means of purifying sand largely depends on attrition scrubbing whereby grain to grain abrasion takes place, causing the sand grain surfaces to be cleaned by reducing clay and iron minerals adhering there.

Virtually all sand deposits require some form of beneficiation to reduce the $Fe_2O_3$ content to a level suitable for use in the preparation of colourless glass. Generally this level is about 0.03% $Fe_2O_3$. As the deposits of high quality sand become depleted it is necessary to develop processes which are capable of treating raw sand with a higher level of impurities than that which has previously been processed to achieve glass-making sand specification.

Our copending UK Patent Application GB 2111035A discloses a process for treating sand which includes one or more stages in which the sand is subjected to mechanical attrition in the presence of zinc or sodium hydrosulphite and an acid selected from sulphuric acid and hydrofluoric acid at a solids content of at least 70% by weight and preferably by 80% by weight.

It has been found that by attrition scrubbing of the sand grains in the presence of zinc or sodium hydrosulphite and hydrofluoric acid or sulphuric acid, a quick and effective method of removing iron impurities from the sand is provided. The treatment stage may vary in time generally from 1 to 20 minutes and it has been found that the effect generally takes place during the first five minutes of the treatment. The treatment stage is referred to hereinafter as an "attreatment" stage. On completion of the attreatment stage, the sand is washed, eliminating iron in solution, and the attreatment stage may be repeated several times to increase the purity of the product.

The present invention provides a new and improved process which may be used for purifying raw sand to glass-making specification.

BRIEF SUMMARY OF THE INVENTION

According to the present invention there is provided a process for treating sand which includes one or more stages in which sand is mixed with a dilute aqueous solution of hydrofluoric or sulphuric acid together with zinc or sodium hydrosulphite and the resulting slurry is agitated at ambient temperature in an atmospheric oxygen-free environment.

It has been found that the provision of an atmospheric oxygen-free environment during treatment of sand with acid and hydrosulphite significantly increases the efficiency of the treatment achieving greater reductions in iron content. It is believed that the presence of oxygen rapidly deactivates the reagents and accordingly the provision of an inert environment allows the reagents to maintain maximum reactivity.

The treatment stage of the invention may utilze a slurry of sand, acid and hydrosulphite over a wide range of solids content. Vigorous agitation of the slurry is desirable and preferably the solids content is high, e.g. at least 70%, preferably 80% by weight, and agitation conditions are sufficient to cause attrition. The agitation is normally for a period of from 1 to 20 minutes, generally about 10 minutes is sufficient.

The treatment stage of the invention may be used in combination with other conventional treatment stages known in the art. Prior to the treatment stage of the invention, the sand is preferably washed and screened to a suitable particle size. After the treatment stage of the invention the sand is preferably subjected to flotation, e.g. at a solids content of 15 to 35% by weight. If desired the treatment stage of the invention may be repeated several times to increase the purity of the sand with washing between each stage. The atmospheric oxygen-free environment may be readily obtained by conducting the treatment stage of the invention in an enclosed vessel and purging the air therefrom by the provision of an inert gas, e.g. nitrogen or argon. The gas may be introduced above the slurry of sand and reagents or may be bubbled through the slurry.

The invention will now be illustrated by the following Examples.

EXAMPLES

The following process conditions were employed in the Examples

(a) Washing

A sample of raw sand was washed through an 18 mesh laboratory test sieve into a laboratory flotation cell and water was added until the pulp density was 20% solids by weight. Agitation of the pulp was carried out at 1700 rpm using the standard flotation assembly for a period of 2.5 minutes, after which time the agitation was ceased, the impeller assembly removed from the cell (any sand particles adhering to the unit were washed back into the cell). The suspension in the cell was allowed to settle for 30 seconds and then the supernatant liquor was decanted off—the settled sand was then washed by decantation with tap water for a further three times and the final washed sand was filtered. This washing procedure was repeated on several batches of sand in order to produce a large washed sample, which was carefully mixed to ensure homogeneity. A small sub-sample of the material was taken to provide a washed, chemically unprocessed head sample for chemical analysis.

(b) Attrition

A sample of washed—18 mesh sand was placed in an attrition cell and tap water added to give a pulp density of 75% solids. Attrition was carried out at 1700 rpm for a period of 10 minutes, then the attrited sand was transferred into a 5 litre capacity flotation cell and washed by decantation with tap water until a clear supernatant liquor was obtained (settling time was 30 seconds). After washing, the attrited sand was filtered and a sub-sample taken for analysis.

(c) Treatment

A sample of washed—18 mesh sand was placed in a plastics container fitted with a lid and tap water was added to give a pulp density of 60% solids. The pulp was agitated by an impeller blade driven by a shaft passed through a hole in the reaction vessel lid. A measured quantity of dilute sulphuric acid or dilute hydrofluoric acid was added to the pulp and pulp agitation commenced, this was immediately followed by the addition of a measured quantity of sodium hydrosulphite (Hydros). Agitation was continued at 1300 rpm for a period of 5 minutes, when the impeller was stopped and the slurry transferred into the 5 liter flotation cell where it was washed by decantation with tap water until the resultant liquor attained neutrality. The treated sand sample was filtered and a sub-sample taken for analysis.

(d) Attreatment

A sample of washed—18 mesh sand was placed in the laboratory attrition cell and tap water was added to give a pulp density of 75% solids. A measured quantity of dilute sulphuric acid was added to the pulp and pulp agitation commenced, this was immediately followed by the addition of a measured amount of sodium hydrosulphite (Hydros). Agitation of the slurry was continued at 1700 rpm for 10 minutes, when the process was terminated and the slurry transferred into a 5 liter flotation cell. The sand was washed by repeated decantation to neutrality with tap water, the washed sand was then filtered and a sub-sample taken for chemical analysis.

(e) Atmospheric oxygen-free environment

Inert gas (nitrogen or argon) was introduced to the treatment pulp either via a flexible plastics tube inserted in the pulp approximately 2.5 cm beneath the pulp surface or above the pulp surface; air ingress was prevented by the plastics reaction vessel lid and by ensuring a slight positive inert gas pressure inside the vessel.

In the case of attreatment, the inert gas was introduced above the pulp to displace all the air within the attrition cell.

(f) Flotation

A sample of the sand to be floated was placed in the 2.5 liter capacity laboratory flotation cell and made up to 60% solids with tap water. The pH of the solution was adjusted to 2.25 with dilute sulphuric acid and 0.5 kg te$^{-1}$ of a petroleum sulphonate type collector added and the pulp was conditioned at 1700 rpm for 0.5 minute. The pulp was then diluted with tap water until the slurry level was approximately 6 mm below the lip of the flotation cell (i.e. 18% solids), the solution pH was readjusted to 2.25 with dilute sulphuric acid, 0.5 kg te$^{-1}$ of a sodium dodecyl sulphonate type frother was then added and froth flotation was carried out for a period of 2 minutes. After completion of flotation, the purified sand was washed by decantation, as previously, and a sub-sample taken for chemical analysis.

A series of experiments were conducted employing an acid/Hydros treatment at different reagent concentrations and different solids content and agitation conditions in air and under an inert atmosphere. The results of the experiments are reported in the following Table 1 in which "Treat" refers to treatment (c), "Attreat" refers to attreatment (d), and "Flt." refers to flotation (f) as described previously.

The symbol "te" used herein refers to a metric ton which equals $10^3$ Kg.

TABLE 1

| | | Reagent Addition | | Chemical Analysis % $Fe_2O_3$ | | |
| | | | | Treatment/ Attreatment | Treatment/Attreatment under inert atmosphere | |
| Example | Process | Acid kg te$^{-1}$ | Hydros kg te$^{-1}$ | in air | (gas) | |
|---|---|---|---|---|---|---|
| | Washed sample —18 mesh | — | — | 0.11 | — | |
| | Washed sample attrited | — | — | 0.086 | — | |
| | Washed sample attrited/ flotation | — | — | 0.073 | — | |
| 1 | HF/Hydros Treat | 1.6 | 0.5 | 0.081 | 0.077 | (argon) |
| | HF/Hydros Treat/Flt. | 1.6 | 0.5 | 0.072 | 0.064 | (argon) |
| 2 | $H_2SO_4$/Hydros Treat | 0.6 | 0.4 | 0.093 | 0.083 | (argon) |
| | $H_2SO_4$/Hydros Treat/Flt. | 0.6 | 0.4 | 0.082 | 0.073 | (argon) |
| 3 | $H_2SO_4$/Hydros Treat | 1.6 | 1.6 | 0.052 | 0.046 | (nitrogen) |
| | $H_2SO_4$/Hydros Treat/Flt. | 1.6 | 1.6 | 0.047 | 0.036 | (nitrogen) |
| 4 | $H_2SO_4$/Hydros Attreat | 0.5 | 0.5 | 0.074 | 0.067 | (argon) |

TABLE 1-continued

| | | Reagent Addition | | Chemical Analysis % $Fe_2O_3$ | | |
| --- | --- | --- | --- | --- | --- | --- |
| | | | | Treatment/Attreatment in air | Treatment/Attreatment under inert atmosphere | |
| Example | Process | Acid kg te$^{-1}$ | Hydros kg te$^{-1}$ | | | (gas) |
| 5 | $H_2SO_4$/Hydros Attreat/Flt. | 0.5 | 0.5 | 0.063 | 0.058 | (argon) |
| | $H_2SO_4$/Hydros Attreat | 1.6 | 1.6 | 0.047 | 0.040 | (nitrogen) |
| | $H_2SO_4$/Hydros Attreat/Flt. | 1.6 | 1.6 | 0.038 | 0.031 | (nitrogen) |

It will be noted that, without exception, in both the treatment and attreatment processes the absence of atmospheric oxygen produces a significant increase in the efficiency of the processes and the iron oxide content of the product is substantially reduced.

The reagent concentrations used in the Examples range from 0.5 to 1.6 kg te$^{-1}$ acid and 0.4 to 1.6 kg te$^{-1}$ Hydros and it has been found that increasing the reagent levels of both acid and Hydros give further improvements in the reduction of iron oxide. However, from an economic point of view it is desirable not to use high levels of reagents.

We claim:

1. A process for treating sand which includes one or more stages in which sand is mixed with a hydrosulphite selected from the group consisting of zinc hydrosulphite, sodium hydrosulphite and mixtures thereof and an acid selected from the group consisting of sulphuric acid, hydrofluoric acid and mixtures thereof and the resulting slurry is agitated at ambient temperature in an atmospheric oxygen-free environment.

2. A process according to claim 1, wherein the solids content of the slurry is at least 70% by weight.

3. A process according to claim 2, characterised in that the solids content of the slurry is at least 80% by weight.

4. A process according to claim 2, wherein the agitation conditions are sufficient to cause attrition.

5. A process according to claim 4, wherein the agitation is conducted in a mechanical attrition scrubber.

6. A process according to claim 1, wherein said treatment is conducted in an enclosed vessel and atmospheric oxygen is purged therefrom by the provision of an inert gas.

7. A process according to claim 1, wherein the concentration of acid is in the range 0.5 to 1.6 kg te$^{-1}$.

8. A process according to claim 1, wherein the concentration of hydrosulphite is in the range 0.4 to 1.6 kg te$^{-1}$.

9. A process according to claim 1, wherein the slurry is subjected to agitation for a period of 1 to 20 minutes.

10. A process according to claim 1, wherein the sand is subjected to a plurality of said treatment stages with washing between each stage.

11. A process for treating sand which includes one or more stages in which the sand is mixed with from 0.4 to 1.6 kg te$^{-1}$ of hydrosulphite selected from the group consisting of zinc hydrosulphite, sodium hydrosulphite and mixtures thereof and from 0.5 to 1.6 kg te$^{-1}$ of an acid selected from sulphuric acid, hydrofluoric acid and mixtures thereof to provide a slurry having a solids content of at least 70% by weight, agitating said slurry at ambient temperature under conditions sufficient to cause attrition, said treatment being conducted in an oxygen-free environment.

12. The process according to claim 11, further comprising subjecting the sand to froth flotation following said treatment.

* * * * *